United States Patent [19]

Longenecker

[11] 4,383,678
[45] May 17, 1983

[54] ELECTRIC FURNACE SCRAP HANDLING MILL LAYOUT

[76] Inventor: Levi S. Longenecker, 61 Mayfair Dr., Pittsburgh, Pa. 15228

[21] Appl. No.: 307,187

[22] Filed: Oct. 1, 1981

[51] Int. Cl.³ .............................................. C22B 1/00
[52] U.S. Cl. .................................. 266/142; 266/901; 75/44 S
[58] Field of Search .................... 266/44, 142, 901; 75/44 S; 373/80

[56] References Cited

U.S. PATENT DOCUMENTS

| | | | |
|---|---|---|---|
| 2,804,295 | 8/1957 | Brooke | 266/901 |
| 3,180,724 | 4/1965 | Brooke | 75/13 |
| 3,479,438 | 11/1969 | Longenecker | 373/80 |
| 3,632,094 | 1/1972 | Longenecker | 432/7 |
| 3,669,436 | 6/1972 | Kemmetmueller | 266/901 |
| 3,772,448 | 11/1973 | Bowermaster et al. | 13/10 |
| 4,146,742 | 3/1979 | Longenecker | 373/74 |
| 4,328,388 | 5/1982 | Longenecker | 373/80 |

*Primary Examiner*—L. Dewayne Rutledge
*Assistant Examiner*—Christopher W. Brody

*Attorney, Agent, or Firm*—Parmelee, Miller, Welsh & Kratz

[57] ABSTRACT

A mill layout operating apparatus system and procedure for maximizing the recovery of exhaust or effluent gases from an electric arc metal refining or melting furnace is provided that makes use of a longitudinally extending scrap preheating bucket station providing ductway pad. The pad extends at its end to provide a down-positioned scrap loading station for each bucket immediately after its preheated content has been fed into the furnace preliminary to a second melting operation. At the same time, scrap buckets are positioned along the parallel stations of the ductway pad to preheat their scrap loads with the effluent or exhaust gas issuing from a smoke chest of the furnace and as generated by a preceding melting-down operation. The number of or capacities of the preheating buckets to be positioned on the ductway pad is proportioned to the amount of charge required for each furnace melting-down operation. This enables the furnace to be fully charged with scrap that has been preheated from a previous melting operation at one opening of the furnace roof, and within a minimum period of time from the standpoint of maintaining its roof crown portion in an open position.

20 Claims, 8 Drawing Figures

ELECTRIC FURNACE SCRAP HANDLING MILL LAYOUT

FIELD OF THE INVENTION

The invention relates to an improved mill layout for melting down and/or refining metal, such as in an electric furnace that will normally make use of a scrap charge. An important feature of the invention deals with the utilization of heat that may be normally lost from each melting operation in such a manner that a full furnace scrap charge may be suitably preheated during each melting operation by hot effluent issuing from the smoke hole of the furnace. The system involved also permits substantially full and unhampered roof crown and electrode removal and repositioning, furnace pouring, etc. That is, the layout is flexible and efficient in its utilization and avoids interference with the normal operation and utilization of conventional furnace auxiliary equipment.

DESCRIPTION OF THE PRIOR ART

It has been generally customary in the art to utilize scrap clamshell buckets which are swung into and out of an overhead charging position and which, at the charging position, require means to open and feed the charge of scrap into the open mouth of the furnace after its roof has been removed. As set forth in my U.S. Pat. No. 3,632,094, upright, preheated scrap containers have been provided in which scrap is preheated by furnace gas or gas from an auxiliary furnace as disclosed in my U.S. Pat. No. 3,479,438. Usually, however, hot exhaust effluent is directly discharged into an exhaust duct and, after conditioning, is exhausted to the atmosphere thus wasting its heat content.

In my earlier filed application, Ser. No. 120,622 of Feb. 11, 1980, I disclosed a combination furnace and scrap bucket assembly in which a large scrap bucket has a pivotally fixed position with respect to the furnace and utilizes hot effluent from the furnace for preheating scrap to be charged thereto. Such bucket is tilted at its fixed furnace location for discharging its preheated scrap. Although this arrangement is conserving of heat energy and minmizes wear and tear on the furnace interior, however, it is limited from the standpoint of the amount of charge that can be thus preheated, and thus tends to limit the size of the furnace which is utilized. Further, this approach has the disadvantage that it tends to complicate the mounting of auxiliary furnace equipment such as used for raising and swinging the roof and the electrodes into and out of position, and for operating the electrodes.

There has thus been a need for a mill layout which will be flexible and substantially fully non-interfering from the standpoint of the furnace or its size, and the amount of scrap charge required therefor and which will, at the same time, assure a preheating of all of the scrap to be charged at one furnace opening and a maximized utilization of the heat energy of the fume or smoke effluent leaving its smoke hole. It should be flexible from the standpoint of non-interference with other equippage or auxiliary parts of the furnace and of limiting any desirable mounting or operation of such auxiliary parts or equipment.

SUMMARY OF THE INVENTION

It has thus been an object of the invention to provide an improved mill layout from the standpoint of a melting furnace operation, its equipment, its exhaust effluent heat energy utilization, and its full scrap charging with scrap that is preheated by a preceding melting operation of the furnace.

Another object has been to develop an improved procedure and operative layout for utilizing waste or exhaust heat from the smoke hole of a melting furnace and, in such a manner, that a maximized and efficient utilization use of the heat is accomplished and a full preheating of the scrap charge may be effected while protecting the environment from the fume utilized.

A further object of the invention has been to provide a mill layout in which a group of scrap buckets is utilized having a combined capacity corresponding to the scrap capacity of the melting furnace.

A still further object of the invention has been to provide a mill layout which involves the employment of a series of scrap preheating stations that are supplied with hot effluent from the furnace and which are employed to selectively preheat scrap in a series of buckets and to provide for the loading of the buckets for preheating, all without directly exhausting the effluent into the ambient atmosphere.

These and other objects of the invention will appear to be obvious to those skilled in the art from the illustrated embodiments and the description thereof.

DETAILED DESCRIPTION

Figure 3:
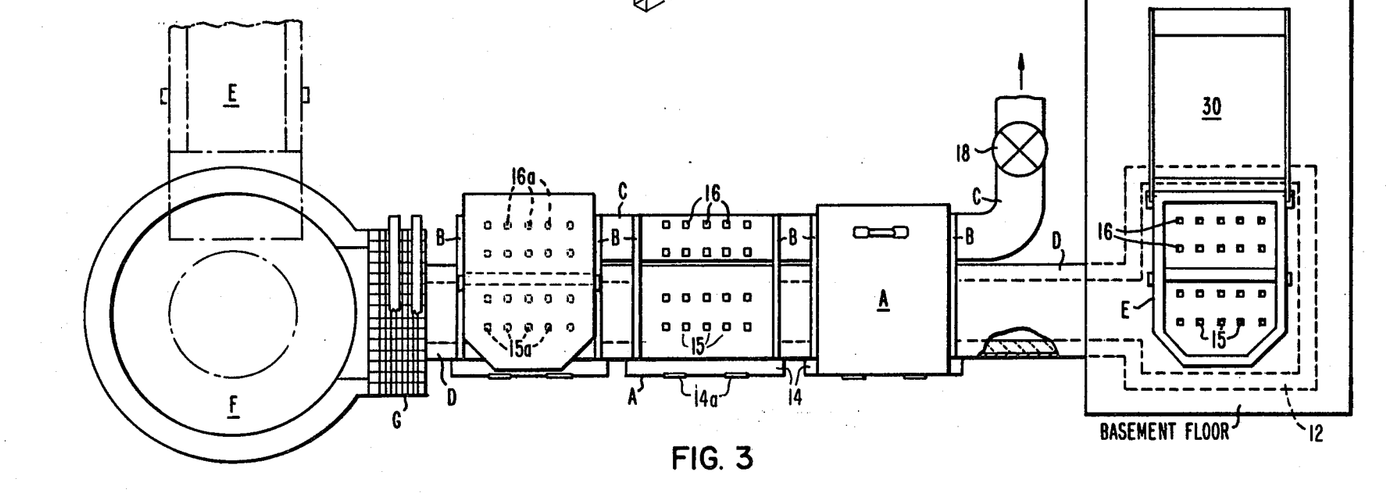
FIG. 3 is a top plan view of a mill layout involving the invention and illustrating stations for preheating scrap buckets as well as a scrap bucket charging station such as shown in FIG. 2.
Figure 4:
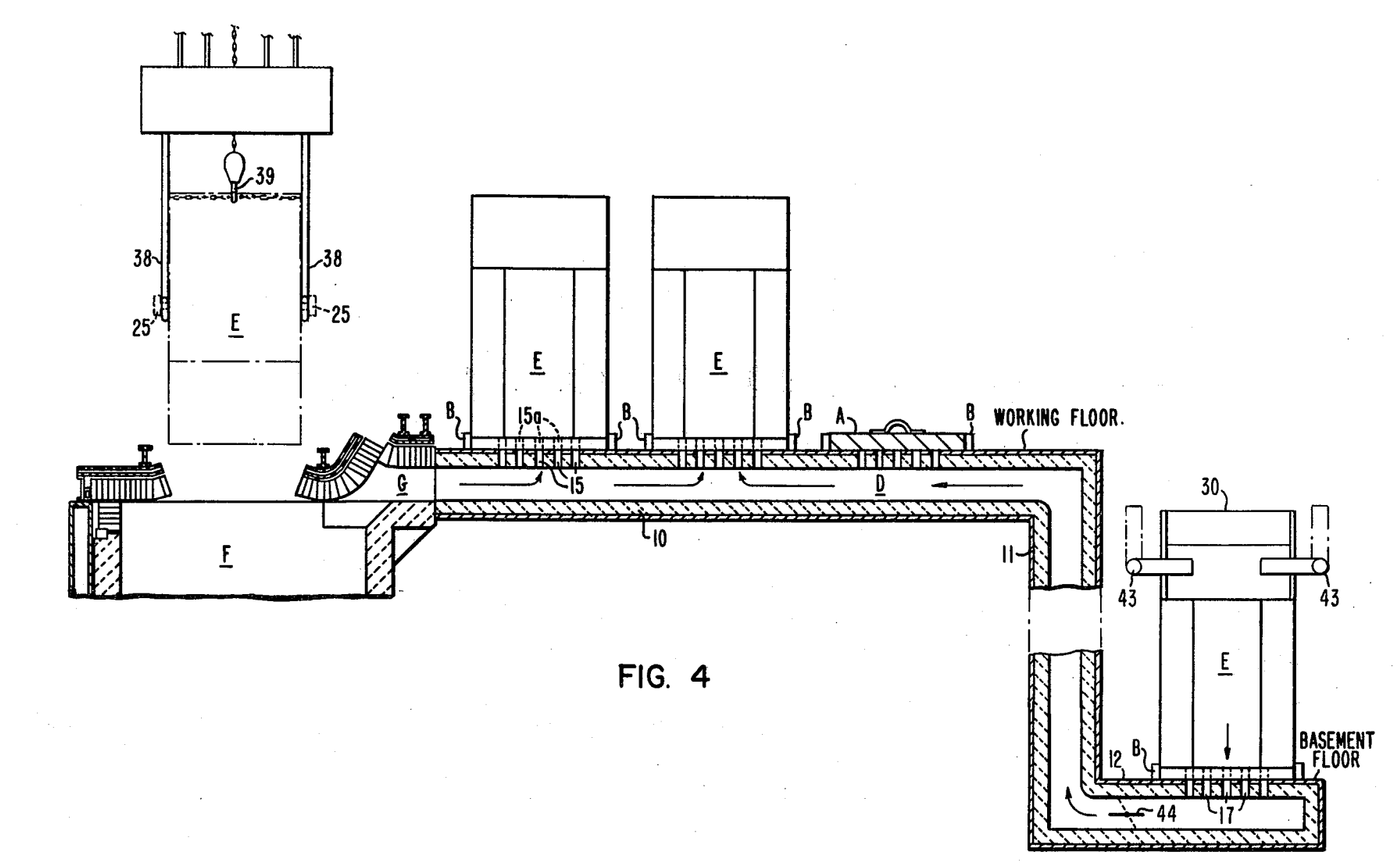
FIG. 4 is a vertical side sectional view in elevation on the same scale as FIG. 3 and of the same layout therein shown. This FIGURE also illustrates flow of hot gases along a ductway pad, and lid means which is used to close-off ports at a preheating station when a bucket has been removed therefrom, for example, for charging the furnace.
Figure 7:
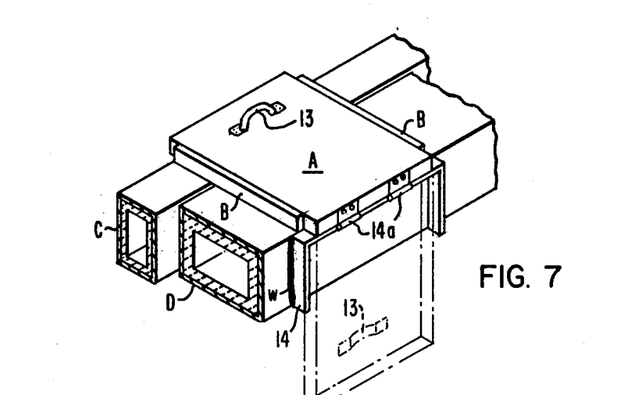
FIG. 7 is a fragmental isometric view taken through the structure shown in FIGS. 3 and 4 and illustrating the positioning and mounting of a swing lid that is used for closing-off the ports at each preheating station when a preheating scrap bucket has been removed therefrom.

Referring particularly to FIGS. 3, 4 and 7, a plant or mill layout is illustrated which includes a metal melting furnace F which has a refractory crown (not shown but illustrated, for example, in FIGS. 1 and 2 of my U.S. Pat. No. 4,146,742) that is adapted to close-off a central charging opening therein and to provide a site for through-extending electrodes, assuming the use of an electrode furnace. Again referring to these FIGURES, hot fume and smoke effluent from the furnace melting operation passes from a smoke chest or hole portion G through its side opening to provide a flow of the hot effluent endwise into and along a metal-encased, refractory-lined ductway pad D. The ductway D is shown provided with a scrap preheating station defining, main length pad portion 10 (see FIG. 4) that extends horizontally longitudinally along a so-called working floor level of the mill. This main pad portion 10 has a progression of scrap bucket preheating stations therealong and, at its outer end, is connected to a downwardly extending portion 11 which, in turn, is connected to a lower, horizontally extending, loading station defining pad portion 12.

Each preheating station is defined by a pair of cross-extending rim-like guide members B in order to accurately align the ports of each preheating bucket E with corresponding ports extending through an upper side of both the ductway pad D and a side-by-side, parallel exhaust duct C (see FIG. 3). In accordance with the invention, the number of preheating stations is to correspond with the scrap capacities of the preheating buckets E, such that a requisite number of preheating buckets may be employed to simultaneously preheat enough scrap metal during one furnace melting operation to provide a full quantity of preheating scrap that corresponds to the scrap charging requirements of the furnace F for the next or subsequent melting and/or refining operation.

In FIG. 4, three preheating scrap buckets E are shown positioned on three stations along the main extent of the ductway pad portion 10. An initial one of the buckets E is shown lifted-off its preheating station and moved into alignment with the charging opening of the furnace F by a conventional overhead crane and hoist. At such a position, the bucket E may be tilted until its lid or hood 30 swings to an open, scrap-releasing position to discharge the preheated scrap into the open mouth of the furnace. Also, in this FIGURE, one scrap bucket E, after it has delivered its preheated scrap charge, as indicated by its dot and dash position of FIGS. 3 and 4, may be moved to a preliminary scrap loading full line position, on a downwardly offset, endwise located basement floor level. There, it may be filled with scrap from one or more yard buckets 40 in the manner illustrated in FIG. 2 of the drawings. It will be noted that buckets 40 may be employed to carry metal scrap from the plant yard on rail cars or carriages 41 that are adapted to be moved in any suitable manner along a track 42. The track 42 is shown positioned on the plant working floor level to run substantially parallel to and in a spaced relation with respect to the preheating station ductway pad D. As soon as filled with metal scrap, the bucket E may be moved to a vacant preheating station. Each bucket E may be moved in succession or progression from a preheating station along the ductway pad D to a furnace charging position, to the loading position of FIGS. 4 and 5 and back to a preheating station. The procedure is thus repeated as each preheated bucket E is progressively taken from its ductway pad position on the portion 10 and used to charge the furnace. Each bucket E that has been charged at a station pad portion 12 is then successively placed on a vacated station position along the pad portion 10. As further indicated, each bucket E is carried by a pair of overhead conveyor or crane hooks 38 that latch on their trunnions 25 and is tilted by an overhead hoist hook 39.

Figure 5:
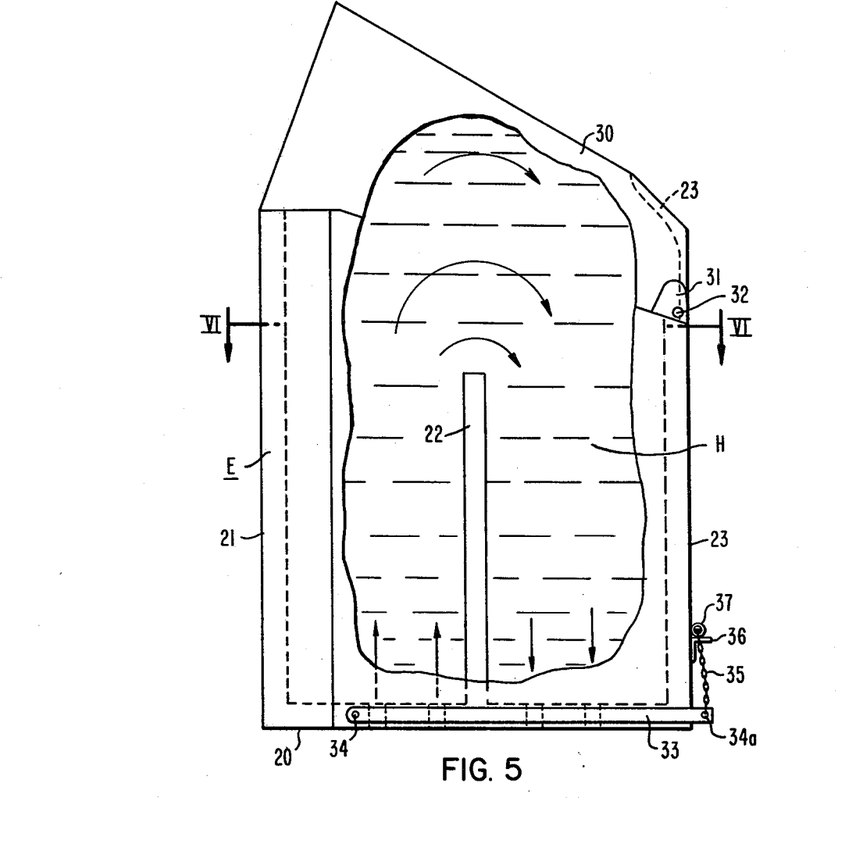
FIG. 5 is an enlarged side view in elevation of a typical scrap preheating bucket used in carrying out the invention.
Figure 6:
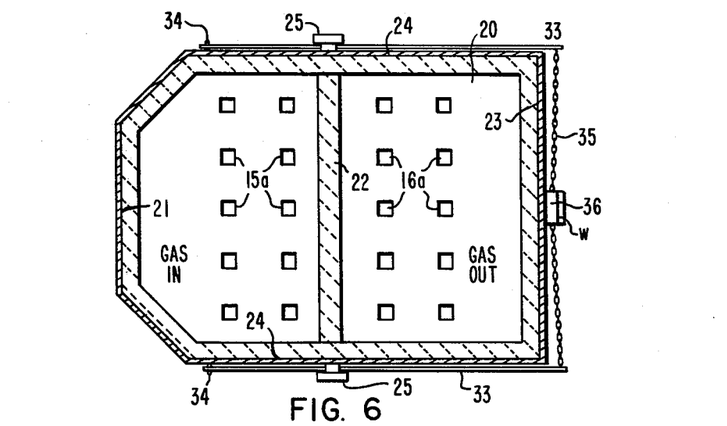
FIG. 6 is a horizontal section on the same scale as and taken along the line VI—VI of FIG. 5.

Referring to FIGS. 2, 3, 5 and 6 of the drawings, the scrap preheating bucket E has an outer metal shell wall which is refractory-lined and which defines a bottom wall portion 20, opposed upright, front and back end wall portions 21 and 23, and opposed side wall portions 24. The upper open end of the bucket E is closed-off by a metal hood, cover or lid 30 which is swingably mounted on a pair of side ears 31 that extend from the side walls 24 and carry pivot pins 32. The interior of each bucket E is partitioned by an upright, refractory, centrally extending wall 22 that defines what may be termed a front entry or higher temperature preheating chamber with the front end wall 21 and what may be termed a lower temperature or back preheating chamber with the back end wall 23. As shown in FIG. 5, scrap H may be filled up over the partition 22 into the overhead space above it that is defined by the hood or cover 30. Thus, as indicated by the arrows of this FIGURE, hot effluent gas will flow upwardly through the scrap in the front chamber into and along scrap in the upper cross space and downwardly through scrap in the back or exit chamber.

In the positioning of the scrap buckets E illustrated in FIG. 3, for example, the bottom wall 20 of each bucket has a group or series of inlet ports 15a (see FIG. 6) which are adapted to register with a similar group of port (outlet) means 15 in the top of the ductway pad D. In a like manner, the back or exit chamber of each bucket E has a group or series of exhaust ports 16a which are adapted to align with similar (inlet) ports 16 in the top wall of the exhaust duct C. Positive flow of hot effluent through the scrap material H in each of the scrap buckets E at their station positions along the ductway pad D is assured by a suction or vacuum fan 18 within the exhaust duct C.

With particular reference to FIGS. 3, 4 and 7, each preheat station along the ductway pad D is provided with a port close-off door or lid A that is hinged at 14a on a mounting frame 14 that is secured, as by weld metal w, to a side of the ductway pad D. As illustrated particularly in FIGS. 3 and 7, the lid A may be swung from a vertical or downwardly extending open position along the side of the ductway D by a handle 13 to an upper, horizontal, closing-off position from the standpoint of the outlet port means 15 of the ductway pad D and the inlet port means 16 of the exhaust duct C. This not only assures retention of hot effluent, but also prevents atmospheric contamination by assuring that the flow is an induced flow into the exhaust duct C and to a conventional cleaning system before discharge into the ambient atmosphere.

Figures 1, 2:
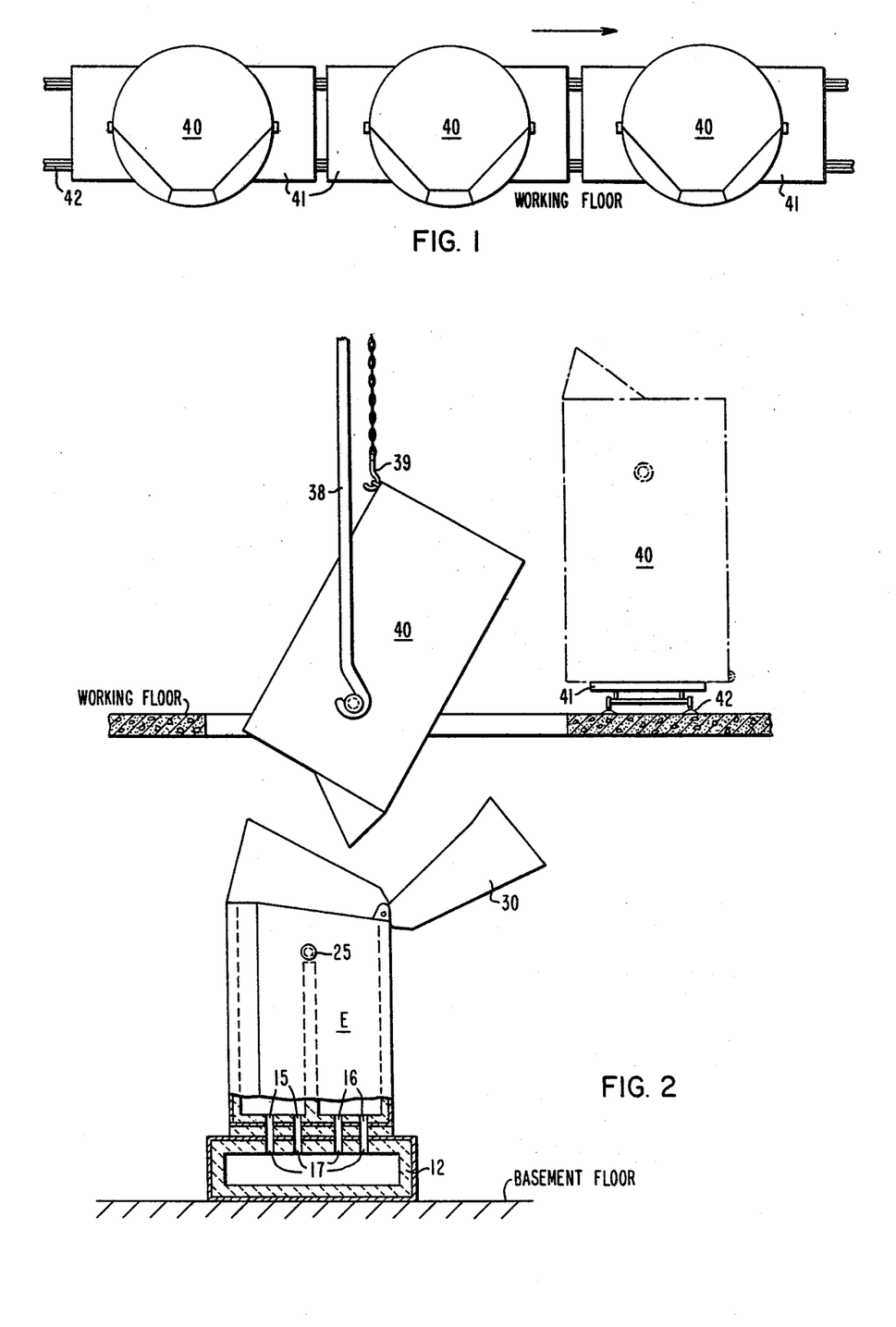
FIG. 1 is a top plan view showing a rail system that may extend from a scrap yard into a mill or plant building and along its working floor for providing scrap to be charged into preheating buckets. In this FIGURE, a group of wheeled yard cars carrying cold scrap containing buckets is shown positioned for movement along a track to a suitable preheating bucket charging position, such as illustrated in FIGS. 2, 3 and 4.
FIG. 2 is a vertical view in elevation and partial section illustrating how each yard scrap bucket of FIG. 1 may be taken off its car by an overhead crane and hoist for tilted discharge into an upper open mouth portion of a scrap preheating bucket while it is located on a lower basement floor level.

At the loading station represented by the station portion 12 of the ductway pad D, its upper wall is provided with a dual grouping of ports 17 (see FIGS. 2, 3 and 4)

which are adapted to align with both groups of ports 15a and 16a in the bottom of each scrap bucket E. This assures that any residual gases in the scrap bucket E can, as indicated by the arrows of FIG. 4, counterflow to enter the main portion 12 of the ductway pad D, and being colder, provide a suitable tempered preheating temperature for the scrap material. At the loading station, as a matter of safety, a pair of gas pilot light elements 43 may be provided (see FIG. 4) to cause the burning of any residual combustible gases that might tend to cause an explosion.

Figure 8:
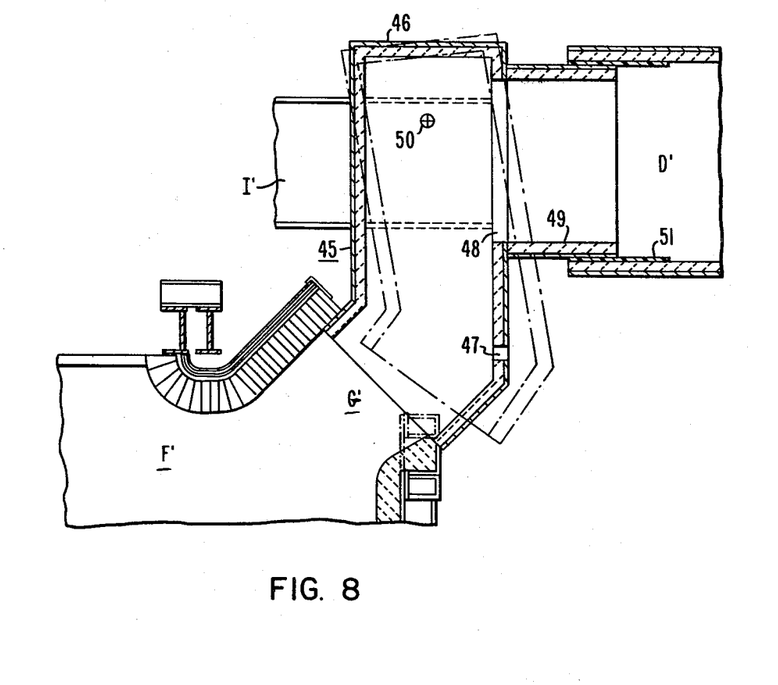
FIG. 8 is a side sectional view in elevation illustrating a modified construction employing the invention which enables a swinging movement of an elbow duct leading from the furnace smoke hole; a flexible telescopic connection is shown between it and a ductway pad to enable an outswing of the elbow duct where the electric furnace uses a gantry crane for raising and rotating its roof to an open position.

In FIG. 8, a modification of the layout is shown which is illustrative of how the system of the present invention may be adapted to a furnace F′ having a smoke hole chest or portion G′ that is upwardly inclined through the roof and side wall thereof, and which employs a gantry crane for raising and swinging its central roof portion or crown out of an open, mouth closing-off position. As shown in this FIGURE, a vertically extending refractory lined elbow duct 45 is adapted at its lower end to have a close interfit with the smoke hole portion G′ of the furnace and to extend upwardly therefrom to discharge effluent from its side wall opening 48 into a ductway pad D′. The upper end of the elbow duct 45 has a closed end wall 46. It is swingably or pivotally mounted on the roof support beam I′ at 50 in order that it may be swung from its full line, fully connected position to its dot and dash line, outward position of FIG. 8 to thus permit the roof to be freely swung therepast when being moved to either open or close-off the furnace charging opening. As also shown in FIG. 8, a refractory-lined sleeve 49 extends horizontally forwardly longitudinally from the elbow 45 for sliding movement within a flexible or resilient bearing sleeve 51 that is carried by the back end of the ductway D′. Thus, in this manner the connection between the two is retained while permitting the minimum of swinging motion of the elbow 45 that is necessary for permitting swing of the furnace roof.

If desired, as shown in FIG. 8, a small side port 47 open to the outside atmosphere may be provided in the elbow duct 47 for introducing cool outside air for tempering the hot exhaust effluent gases to a suitable preheating temperature. As shown in FIG. 4, cooler effluent may also be introduced from the loading station 12 to provide a sufficient tempering.

In carrying out the invention, it is important to make maximum use of the heat found in the exhaust gases or effluent. Thus, the yard cars 41 are used for bringing in the cold scrap from the yard to the loading station 12 to enable a preheating bucket E to be quickly charged after it has delivered its preheated scrap charge into the furnace F, and while it is still in a heated condition. Combustible gas may be introduced into its chambers before or after the scrap is delivered from a yard bucket 40 and ignited by the pilot means 43 to, in effect, provide a combustion chamber into which the scrap may then or has been poured. Scrap wet with oil or other combustible material may have it burnt off at this station.

It will be noted that the exhaust gas is simultaneously introduced into the scrap buckets that are positioned on stations along the pad portion 10 in a parallel flow arrangement, as distinguished from a series arrangement. This assures a substantially equal up and down or reverse through-flow of hot effluent through the scrap in each of the buckets E and therefrom into the exhaust duct C. This is distinguished from what may be termed a series flow in which the first bucket would receive the maximum amount of heat, while the last one would receive a minimum amount, and the suction throughflow force would be reduced due to its movement through a group of preheating buckets E. If the exhaust gases have about one-half million B.T.U's as supplied to the ductway pad D for each ton of steel produced in the furnace F, a recovery of about 50% of this heat will provide an average preheat temperature of the scrap of about 800° F. As a result, about 25% of the melting temperature for the scrap charge may be applied in the group of buckets E, such as the three buckets represented in the drawings, all without the use of any additional energy and only a small amount of fuel for the pilot light at the loading station 12. The flow through the buckets E at the preheating stations along the pad portion 10 is a positive flow as induced by the suction fan 18 in the exhaust duct C. This is also true as to the flow from the loading station at pad portion 12, see the arrows of FIG. 4. A damper 44 in the portion 12 may be closed to avoid ambient air intake when no preheating bucket E is positioned on its loading station. The damper 44 thus has a similar function to the lids A that are shown positioned at the preheating stations along ductway portion 10. Although not a part of the present invention, a funnel-shaped guide may be pivotally carried by the furnace roof structure for swinging movement over its open mouth to prevent spill-over of the preheated scrap during the furnace charging operation.

We claim:

1. A mill layout for using preheated scrap material to charge a metal working furnace which comprises, an upright metal melting furnace having an open mouth portion provided with a removable roof portion for charging the furnace and having a side-positioned refractory-lined smoke hole portion, a ductway pad extending from said smoke hole portion and defining an operating line extending longitudinally forwardly therefrom, a hot effluent-receiving duct connected at one end to said smoke hole portion and extending in a separated substantially parallel relation with respect to said effluent-receiving duct along said ductway pad, a plurality of refractory-lined scrap buckets having a total scrap capacity for one heat to fully scrap-charge the furnace, a loading station for progressively filling each bucket at an outer end of said operating line with scrap material, a series of preheating stations along said ductway pad, each of said preheating stations being adapted to receive a scrap bucket thereon, each of said preheating stations having outport means open from said effluent-receiving duct and inport means open from said exhaust duct, each said scrap bucket being divided into a pair of scrap-receiving and hot-effluent-circulating endwise upwardly connected chambers, each said bucket being adapted to be positioned in an aligned relation on one of said preheating stations and having a bottom wall provided with hot-effluent receiving inport means open from the bottom of one of said chambers to align with said output means of said ductway pad at said preheating stations and enable flow of hot effluent into said one chamber and from it into the other of said chambers, each of said buckets also having output means open from the bottom of the other of said chambers to align with said inport means of said pad at each said preheating station to discharge effluent from said other chamber into said exhaust duct, and overhead means adapted to move scrap containing buckets from said loading station to said ductway pad preheating stations and to thereafter progressively lift each said bucket from its preheating station to charge its preheated scrap content into the open mouth of the furnace.

2. A mill layout as defined in claim 1 wherein means is provided for collecting gases from each bucket in one of said ducts at said loading station.

3. A mill layout as defined in claim 1 wherein, each of said scrap buckets has a swingable normally closed closure lid mounted thereon, and said overhead means is adapted to tilt each said scrap bucket to swing its said lid to an open charging position over the open mouth portion of the furnace.

4. A mill layout as defined in claim 1 wherein, said hot effluent-receiving duct is refractory lined, said loading station is carried on a closed-off front end portion of said ductway pad and has port means open from said effluent-receiving duct and adapted to be aligned with said inport and outport means of each of said buckets when positioned thereat.

5. A mill layout as defined in claim 1 wherein swingable refractory-lined elbow and slide sleeve means is adapted to connect a back end of said hot effluent-receiving duct of said ductway pad to said smoke hole portion of the furnace.

6. A mill layout as defined in claim 1 wherein lid means is provided for closing-off said preheating station outport and inport means from the ambient atmosphere at said preheating stations along said ductway pad when they are exposed by the removal of said buckets therefrom.

7. A mill layout as defined in claim 6 wherein lid means is swingably mounted on said ductway pad to close-off said outport and inport means at each of said preheating stations, and means is positioned to close-off said port means of said loading station when there is no bucket positioned thereat.

8. A mill layout as defined in claim 6 wherein each of said buckets has a top closure lid that is adapted to be retained in a closed position during the preheating of scrap therein and during movement of said buckets between stations, and to be swung to an open position for filling it with scrap at said loading station and for charging preheating scrap into the open mouth portion of the furnace.

9. A mill operating layout which comprises, an upright metal melting furnace having an open mouth portion provided with a removable roof portion for charging the furnace and having a side-positioned refractory-lined smoke hole portion, a ductway pad provided with a refractory lining and extending horizontally longitudinally in an endwise-connected relation from said smoke hole portion and having a hot effluent-receiving duct therealong to receive hot effluent from said smoke hole portion, an exhaust duct along said ductway pad, a plurality of scrap-receiving and preheating upright refractory-lined scrap buckets, each of said buckets having a bottom wall with a partition extending therefrom to define upwardly cross-connected effluent-receiving and effluent-discharging chambers that are adapted to carry metal scrap to be preheated therein, said hot effluent duct and said exhaust duct defining a series of bucket-receiving scrap preheating stations along said ductway pad, first port means open from said hot effluent duct and second port means open from said exhaust duct at each of said stations, a bottom wall portion of said effluent-receiving chamber of each of said buckets having first port means adapted to align with said first port means of said ductway at each of said stations to receive hot effluent therefrom, a bottom wall portion of said effluent-discharging chamber of each of said buckets having second port means adapted to align with said second port means at each of said stations of said ductway pad to discharge effluent into said exhaust duct that has moved through scrap material carried in said chambers of each of said buckets, said ductway pad having an enlarged forward end portion defining a scrap-loading station for each of said buckets, and said forward end portion having a first port means adapted to align with said first port means of each of said buckets and has second port means adapted to align with said second port means of each of said buckets.

10. A mill operating layout as defined in claim 9 wherein, means cooperates with said enlarged forward end portion of said ductway pad for closing-off in-flow of ambient air through said first and second port means thereof when no scrap preheating bucket is positioned at said scrap loading station.

11. A mill operating layout as defined in claim 9 wherein, said enlarged forward end portion is offset downwardly from a main length portion of said ductway pad to provide a horizontal shelf at said loading station, and said pad is adapted to pass effluent from a bucket being loaded at said loading station along said pad in a continuous path with respect to effluent moving along said pad from the smoke hole portion of the furnace.

12. A mill operating layout as defined in claim 11 wherein igniter means is positioned at said scrap loading station, and filled yard scrap cars are operatively positioned to be moved into an overhead charging relation with respect to an upper open end of the bucket at said loading station to charge said bucket.

13. A mill layout which comprises, an upright metal melting furnace having an open mouth portion adapted to carry a movable roof and having a side-positioned refractory-lined smoke hole portion, a refractory-lined ductway pad having a main portion extending longitudinally from and in an aligned hot effluent-receiving endwise-connected relation with said smoke hole portion, said ductway pad having a forward end portion extending downwardly therefrom and forwardly on a scrap-charging lower plant level, a plurality of scrap-preheating furnace-charging refractory-lined buckets having a total scrap receiving capacity sufficient to fully scrap-charge the furnace, an elongated fume discharge duct extending along the main portion of said ductway pad; each of said scrap-preheating buckets defining a hot effluent-receiving vertical chamber, a cross-extending upper connecting chamber and an effluent discharging vertical chamber; said ductway pad and said discharge duct defining a series of bucket-receiving preheating stations therealong, said ductway pad at each preheating station having port means for introducing hot effluent from said pad into the effluent receiving chamber of a bucket placed thereon, said discharge duct at each station having port means for receiving effluent from the discharge chamber of said bucket, said lower level of said ductway pad defining a scrap loading station for a bucket placed thereon, and each of said scrap heating buckets having a swingable hood covering its upper connecting chamber that is adapted to be tilted into an open hot scrap furnace charging position above the furnace after the roof has been moved to expose its open mouth portion.

14. A mill layout as defined in claim 13, wherein a trackway extends along an upper level of the mill in a substantially parallel overhead relation with respect to said ductway pad and in an adjacent overhead charging relation with respect to one of said buckets positioned on said ductway pad at said loading station, and scrap yard cars on said trackway are adapted to be moved therealong into and out of an overhead aligned scrap-charging alignment with the bucket at said loading station.

15. A mill layout as defined in claim 13 wherein means is connected to said discharge duct to apply suction through its said port means to draw furnace effluent from the discharge chamber of said buckets positioned along said pad at said preheating stations.

16. A mill layout as defined in claim 13 wherein igniting means is positioned at said scrap bucket loading station for burning any combustible material present during the loading of the scrap bucket positioned thereat.

17. A mill layout as defined in claim 13 wherein, said ductway pad at said scrap loading station has port means for receiving effluent from a preheating bucket placed thereon, and means is positioned at each of said stations for closing-off the ports thereat when they are uncovered by the removal of scrap preheating buckets therefrom.

18. A mill layout as defined in claim 13 wherein, lids are swingably mounted on said ductway pad and positioned at each of said scrap-preheating stations to close-off the port means in said ductway pad and said exhaust duct when they are exposed by the removal of one of said buckets therefrom to charge its preheated scrap into the furnace.

19. A mill layout as defined in claim 17 wherein a damper is operatively positioned in said ductway pad to close-off said port means at said scrap loading station when no preheating bucket is positioned thereat.

20. A mill layout as defined in claim 13 wherein, each of said buckets has a first set of bottom port portions open to its said hot effluent receiving chamber and a second set open to its said effluent discharging chamber, and said first set is adapted to align with said port means in said ductway pad and said second set is adapted to align with said port means in said discharge duct at each said preheating station.

* * * * *